(12) United States Patent
Stanford

(10) Patent No.: US 11,141,021 B2
(45) Date of Patent: Oct. 12, 2021

(54) TOASTER

(71) Applicant: Albert Stanford, Mooinooi (ZA)

(72) Inventor: Albert Stanford, Mooinooi (ZA)

( * ) Notice: Subject to any disclaimer, the term of this patent is extended or adjusted under 35 U.S.C. 154(b) by 371 days.

(21) Appl. No.: 15/767,441

(22) PCT Filed: Sep. 20, 2016

(86) PCT No.: PCT/ZA2016/050034
§ 371 (c)(1),
(2) Date: Apr. 11, 2018

(87) PCT Pub. No.: WO2017/066812
PCT Pub. Date: Apr. 20, 2017

(65) Prior Publication Data
US 2018/0289213 A1 Oct. 11, 2018

(30) Foreign Application Priority Data

Oct. 12, 2015 (ZA) .................................. 2015/07582

(51) Int. Cl.
*A47J 37/06* (2006.01)
*A47J 37/04* (2006.01)

(52) U.S. Cl.
CPC ......... *A47J 37/0664* (2013.01); *A47J 37/049* (2013.01); *A47J 37/0611* (2013.01); *A47J 37/0629* (2013.01)

(58) Field of Classification Search
CPC .. A47J 37/0664; A47J 37/049; A47J 37/0611; A47J 37/0629
See application file for complete search history.

(56) References Cited

U.S. PATENT DOCUMENTS

| 1,947,124 | A | * | 2/1934 | Clauss | ................. | A47J 37/0611 |
| | | | | | | 99/380 |
| 1,974,204 | A | * | 9/1934 | Cooter | ................. | A47J 37/0611 |
| | | | | | | 99/373 |
| 2,216,984 | A | * | 10/1940 | Pearson | ................. | A47J 33/00 |
| | | | | | | 126/275 R |
| 3,060,494 | A | * | 10/1962 | Noble | ..................... | A47J 43/20 |
| | | | | | | 249/55 |
| 4,214,517 | A | | 7/1980 | Caldwell | | |
| 4,656,927 | A | * | 4/1987 | Mosby | ................ | A47J 37/0892 |
| | | | | | | 99/339 |
| 9,775,462 | B2 | * | 10/2017 | Klock | ..................... | A47J 29/02 |
| 2007/0144359 | A1 | | 6/2007 | Lane et al. | | |
| 2008/0105137 | A1 | * | 5/2008 | Genslak | .............. | A47J 37/0611 |
| | | | | | | 99/350 |

(Continued)

*Primary Examiner* — David P Bryant
*Assistant Examiner* — Nirvana Deonauth
(74) *Attorney, Agent, or Firm* — Ware, Fressola, Maguire & Barber LLP

(57) ABSTRACT

The invention provides an appliance for making a hollow toasted food product. The appliance includes a pair of opposed parts which is hingedly connected along one side such that opposed surfaces can, in use, be folded onto each other, a heating element in heat communication with each surface, a hollow formed in one or each opposed heating surface, such that a cavity is formed when the parts are folded closed onto each other, and wherein the opposed edges of each hollow is proximate each other, when closed. The appliance further includes an inside mould of which the outer surface is complementary and smaller than the inner surface of the cavity.

13 Claims, 2 Drawing Sheets

(56) References Cited

U.S. PATENT DOCUMENTS

| | | | |
|---|---|---|---|
| 2013/0112086 A1* | 5/2013 | Lamont | A47J 37/0611 99/376 |
| 2016/0007799 A1* | 1/2016 | Steeb | A47J 37/0611 426/275 |
| 2018/0184849 A1* | 7/2018 | Hayward | A47J 43/20 |

* cited by examiner

TOASTER

TECHNICAL FIELD OF THE INVENTION

This invention relates to an appliance for making a hollow toasted food product.

BACKGROUND TO THE INVENTION

The inventor is aware of clam type toasters for making a toasted food product. These toasters have two opposed and hingedly connected shell parts. The opposed inner surface of each part have complementary hollow, which when closed together forms an enclosed cavity and presses the edges of the cavity together. In use, a slice of bread is placed on the inner surfaces of each shell part and food filling is placed on one of the slices and the toaster is closed, the edges of the bread slices is pressed together and the bread toasted leaving a closed toasted food product with heated food filling inside. It is to be understood that the food filling is added before the toasting process resulting in a toasted food product with heated food filling.

It is an object of the invention to provide a toaster for making a versatile hollow toasted food product. For the first time a hollow toasted food product can be filled with a wide choice of fresh hot or cold food filling such as meats, vegetables, salads etc. after the toasting process and the fresh taste is retained since the filling is not necessarily heated. The food fillings will be fresh and a person can also add sauces, gravy or spreads to the inside or inside surface of the food product, which is also not heated and fresh. The pocket formed by the food product is sealed and sauces will be retained inside causing no mess when eaten. The food product is also ideal for the fast food industry.

GENERAL DESCRIPTION OF THE INVENTION

According to the invention there is provided an appliance for making a hollow toasted food product, which appliance includes:

a pair of opposed parts which is hingedly connected along one side such that opposed surfaces can, in use, be folded onto each other;

a heating element in heat communication with each surface;

a hollow formed in one or each opposed heating surface, such that a cavity is formed when the parts are folded closed onto each other;

wherein the opposed edges of each hollow is proximate each other, when closed; and an inside mould of which the outer surface is complementary and smaller than the inner surface of the cavity.

The inside mould may be hingedly connected at one end and so that the other end can be lifted out of the cavity so that the food product can be removed. Preferably the inside mould may be loose so that it can be removed from the cavity so that the food product can be removed and the inside mould be easily cleaned after use.

The hollow formed in each opposed heating surface, may be complementary to each other, such that a cavity is formed when the parts are folded closed onto each other and an opening may be formed on one side of the appliance leading to the cavity. A closing part accessory may then be provided to close the opening should a person wish to make a toasted food product without the inside mould.

The opening on one side may be small and dimensioned to allow a handle attached to the inside mould to protrude there through. The handle may be used to position or remove the inside mould.

It is to be appreciated that a slice of bread or similar is placed on one of the heating surfaces, the inside mould placed on top of the slice and extending out of the opening on the side of the appliance and a second slice is put onto the second heating surface and the appliance is closed. The slices are then formed around the inside mould and its edges bonded together by the proximate edges of the cavities during the toasting process, leaving a hollow toasted food product when removed from the appliance and with the inside mould removed out of the food product. The inside mould moulds the hollow formed on the inside of a toasted food product while the pair of opposed surfaces of the opposed parts moulds and toasts the outside of the food product, in use. The hollow food product can be filled with any food filling through the opening left in the food product through which the inside mould is removed.

The inside mould may also include a heating element to heat the outer surface of the inside mould so that, in use, the inside of the food product can also be toasted should it be required. The inside mould will then be provided with a flexible electrical cord to be in electrical contact with electrical connections for the appliance. The appliance may be provided with an electrical switch to put the heating element of the inside mould in electrical contact with an electrical power source, should a person wish to also toast the inside of the hollow food product.

The gap formed between the outer surface of the inside mould and the inner surfaces of the cavities may be less than the thickness of a typical slice of bread.

The shape, viewed from the top, of the cavities and the inside mould my preferably be square.

The opposed edges of the heating surfaces may be respectively and correspondingly grooved and ridged to cut and trim the food product.

The inside mould may be provided with removable or retractable spacer plates extending from its sides to position and suspend the inside mould in the middle of the upper and lower opposed surfaces to ensure a similar gap for the upper and lower slice of bread, in use. The spacer plates may be positioned to separate the edges near the opening formed in the opposed slices of bread of the food product, in use, so that it is not bonded together during the toasting process to allow the opening to be flared open to insert food fillings, if needed. The spacer plates can also be used to increase the distance between the opposed heating surfaces should a thicker food product be desired by a user.

For some embodiments, a further accessory may include a closing insert for closing the opening formed on one side of the appliance and to provide further surfaces complementary to the existing surfaces so that the appliance can be used similar to a known clam type toaster for making a toasted food product. The closing insert may be provided with its own heating element or may rely on heat conducted from the existing heating elements of the appliance.

It will also be appreciated that some embodiments of the invention may include two or more opposed pairs of cavities to enable the making of two or more food products at a time.

DETAILED DESCRIPTION OF THE INVENTION

The invention is now described by way of examples with reference to the accompanying drawings.

Figure 1:
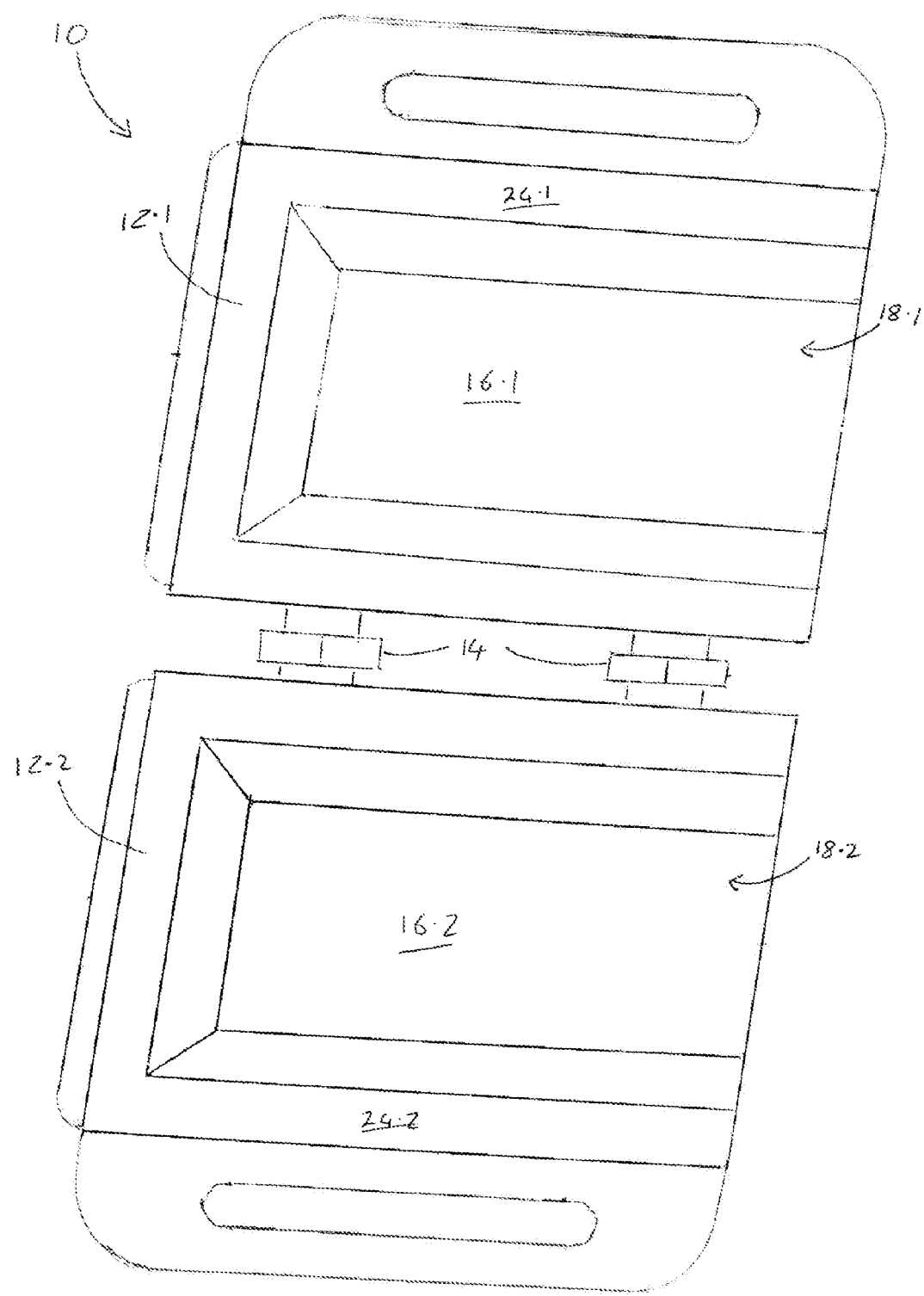
FIG. 1 shows a plan view of an open appliance for making a hollow toasted food product, in accordance with the invention.
Figure 2:
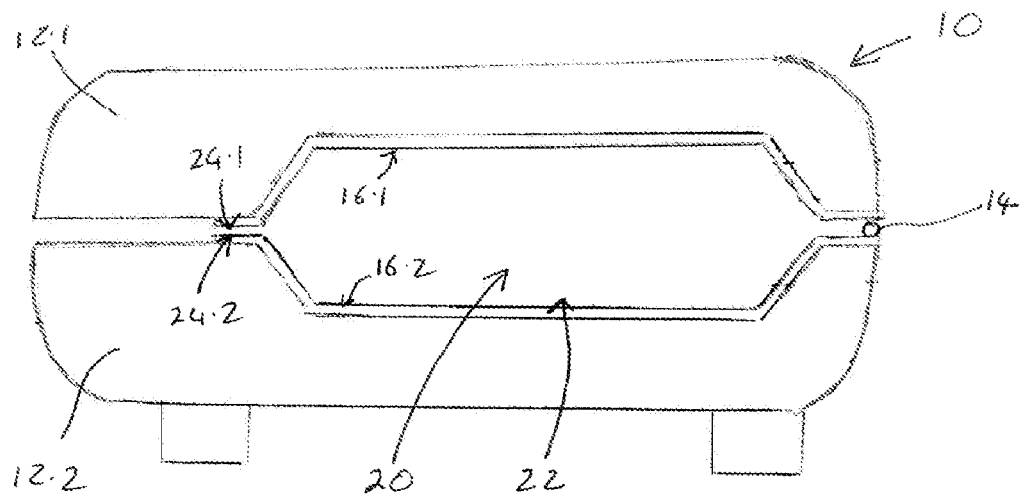
FIG. 2 shows a side view of a closed appliance for making a hollow toasted food product.
Figure 3:
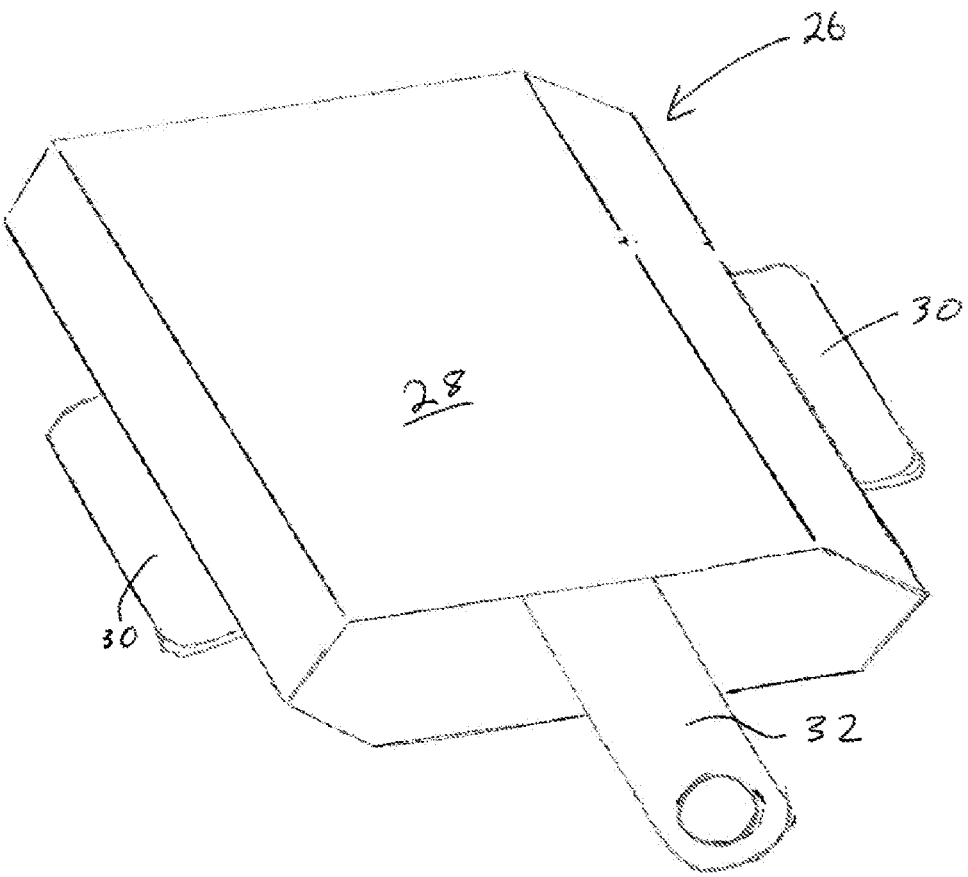
FIG. 3 shows a top perspective view of a inside mould, in accordance with the invention.

Referring now to the drawings, the appliance for making a hollow toasted food product, in accordance with the invention, is generally indicated by reference numeral 10.

The appliance 10 includes a pair of opposed parts 12.1 and 12.2 which is hingedly connected by means of the hinges 14 along one side such that opposed surfaces 16.1 and 16.2 can, in use, be folded onto each other. The appliance also includes electrical heating elements, not shown, in heat communication with each surface 16.1 and 16.2. A generally square hollow 18.1 and 18.2 is formed from one side of and in each opposed heating surface 16.1 and 16.2, complementary to each other, such that a cavity 20 is formed when the parts 12.1 and 12.2 are folded closed onto each other and wherein an opening 22 is formed on one side of the appliance 10 leading to the cavity 20. The opposed edges 24.1 and 24.2 of each hollow 18.1 and 18.2 is proximate each other, when closed. The appliance 10 also includes an inside mould 26 of which the outer surface 28 is complementary and smaller than the inner surfaces 16.1 and 16.2 of the cavity 20. The gap formed between the outer surface 28 of the inside mould 26 and the inner surfaces of the cavities 16.1 and 16.2 is be less than the thickness of a pair typical slice of bread, 5 mm. The inside mould 26 is provided with removable spacer plates 30 extending from its sides to suspend the inside mould 26 in the middle of the upper and lower opposed surfaces to ensure a similar gap for the upper and lower slice of bread, in use. The spacer plates 30 is positioned to separate the edges near the opening formed in the opposed slices of bread of the food product, in use, so that it is not bonded together during the toasting process to allow the opening to be flared open to insert food fillings, if needed. The inside mould 26 also includes a handle 32.

In an alternative embodiment of the invention, the inside mould 26 also includes a heating element to heat the outer surface 28 of the inside mould so that, in use, the inside of the food product can also be toasted should it be required. The inside mould is provided with a flexible electrical cord (not shown) to be in electrical contact with electrical connections for the appliance 10. The appliance 10 is provided with an electrical switch (not sown) to put the heating element of the inside mould 26 in electrical contact with an electrical power source, should a person wish to also toast the inside of the hollow food product.

It shall be understood that the examples are provided for illustrating the invention further and to assist a person skilled in the art with understanding the invention and are not meant to be construed as unduly limiting the reasonable scope of the invention.

The invention claimed is:

1. An appliance for making a hollow toasted bread food product, the appliance comprising:
    a pair of opposed parts which are hingedly connected along one side such that opposed heating surfaces can, in use, be folded onto each other;
    a heating element in heat communication with each of the opposed heating surfaces;
    a hollow formed in one or each of the opposed heating surfaces and defining a respective edge along each of the opposed heating surfaces, such that a cavity is formed when the opposed parts are folded closed onto each other;
    wherein opposed edges of each hollow are proximate each other when closed;
    an inside mould having an outer surface which is complementary and smaller than an inner surface of the cavity to accommodate, in use, two bread slices to be toasted and shaped, and wherein edges of the two bread slices are bonded to each other with a defined hollow between the two bread slices;
    and wherein the inside mould includes sides with removable or retractable spacer plates extending therefrom and is removable from the cavity.

2. The appliance as recited in claim 1, wherein the hollow formed in each of the opposed heating surfaces are complementary to each other, such that the cavity is formed when the opposed parts are folded closed onto each other and an opening is formed on one side of the appliance leading to the cavity.

3. The appliance as recited in claim 2, wherein the opening on one side is dimensioned to allow a handle attached to the inside mould to protrude there through.

4. The appliance as recited in claim 1, wherein the inside mould comprises a heating element to heat the outer surface of the inside mould.

5. The appliance as recited in claim 4, wherein the opposed edges of each hollow of the opposed heating surfaces are respectively and correspondingly grooved and ridged to cut and trim the hollow toasted bread food product.

6. The appliance as recited in claim 1, wherein the removeable or retractable spacer plates are positioned to separate the edges at an opening formed in the two bread slices of the hollow toasted bread food product, in use.

7. The appliance as recited in claim 4, wherein the hollow formed in each of the opposed heating surfaces are complementary to each other, such that the cavity is formed when the opposed parts are folded closed onto each other, and an opening is formed on one side of the appliance leading to the cavity.

8. The appliance as recited in claim 3, wherein the inside mould comprises a heating element to heat the outer surface of the inside mould.

9. The appliance as recited in claim 1, wherein the opposed edges of each hollow of the opposed heating surfaces are respectively and correspondingly grooved and ridged to cut and trim the hollow toasted bread food product.

10. The appliance as recited in claim 2, wherein the inside mould comprises a heating element to heat the outer surface of the inside mould.

11. The appliance as recited in claim 2, wherein the opposed edges of each hollow of the opposed heating surfaces are respectively and correspondingly grooved and ridged to cut and trim the hollow toasted bread food product.

12. The appliance as recited in claim 6, wherein the inside mould comprises a heating element to heat the outer surface of the inside mould.

13. The appliance as recited in claim 3, wherein the opposed edges of each hollow of the opposed heating surfaces are respectively and correspondingly grooved and ridged to cut and trim the hollow toasted bread food product.

* * * * *